(12) United States Patent
Patwardhan et al.

(10) Patent No.: US 7,443,692 B2
(45) Date of Patent: Oct. 28, 2008

(54) POWER CONVERTER ARCHITECTURE EMPLOYING AT LEAST ONE CAPACITOR ACROSS A DC BUS

(75) Inventors: Ajay V. Patwardhan, Canton, MI (US); Douglas K. Maly, Canton, MI (US); Sayeed Ahmed, Canton, MI (US); Fred Flett, Bloomfield, MI (US)

(73) Assignee: Continental Automotive Systems US, Inc., Auburn Hills ( * ) Notice: Subject to any disclaimer, the term of this patent is extended or adjusted under 35 U.S.C. 154(b) by 875 days.

(21) Appl. No.: 10/664,808

(22) Filed: Sep. 17, 2003

(65) Prior Publication Data

US 2004/0230847 A1    Nov. 18, 2004

Related U.S. Application Data

(60) Provisional application No. 60/471,387, filed on May 16, 2003.

(51) Int. Cl.
*H01R 9/00* (2006.01)

(52) U.S. Cl. .................. 361/775; 361/777; 361/803

(58) Field of Classification Search ......... 361/775–777, 361/803; 257/690–692
See application file for complete search history.

(56) References Cited

U.S. PATENT DOCUMENTS

| | | | |
|---|---|---|---|
| 4,142,231 A | 2/1979 | Wilson et al. | 363/141 |
| 4,224,663 A | 9/1980 | Maiese et al. | 363/144 |
| 4,458,305 A | 7/1984 | Buckle et al. | 363/141 |
| 4,661,897 A | 4/1987 | Pitel | 363/17 |
| 4,674,024 A | 6/1987 | Paice et al. | 363/71 |
| 5,172,310 A | 12/1992 | Deam et al. | 363/144 |
| 5,184,291 A | 2/1993 | Crowe et al. | 363/37 |
| 5,230,632 A | 7/1993 | Baumberger et al. | 439/66 |
| 5,243,757 A | 9/1993 | Grabbe et al. | 29/882 |
| 5,264,761 A | 11/1993 | Johnson | 315/291 |
| 5,395,252 A | 3/1995 | White | 439/66 |
| 5,422,440 A | 6/1995 | Palma | 174/133 B |
| 5,439,398 A | 8/1995 | Testa et al. | 439/801 |
| 5,445,526 A | 8/1995 | Hoshino et al. | 439/69 |
| 5,459,356 A | 10/1995 | Schulze et al. | 257/773 |
| 5,508,560 A | 4/1996 | Koehler et al. | 257/730 |
| 5,537,074 A | 7/1996 | Iversen et al. | 327/564 |
| 5,559,374 A | 9/1996 | Ohta et al. | 257/723 |
| 5,635,751 A | 6/1997 | Ikeda et al. | 257/584 |

(Continued)

FOREIGN PATENT DOCUMENTS

DE    195 19 538 A1    11/1996

(Continued)

OTHER PUBLICATIONS

Mohan et al., *Power Electronics: Converters, Applications and Designs*, John Wiley & Sons Inc., USA, 1989, Chapter 26-8, "Circuit Layout," p. 654.

(Continued)

*Primary Examiner*—Tuan T Dinh

(57) ABSTRACT

A power converter utilizes a high frequency capacitor and a bulk capacitor coupled across the DC terminals to reduce high frequency effect and voltage overshoot, leading to space and cost savings in power converter design. Each capacitor may be physically coupled adjacent the gate driver board via clips, clamps, and/or fasteners.

2 Claims, 4 Drawing Sheets

U.S. PATENT DOCUMENTS

| | | | | |
|---|---|---|---|---|
| 5,653,598 | A | | 8/1997 | Grabbe .................. 439/66 |
| 5,756,935 | A | | 5/1998 | Balanovsky et al. ....... 174/52.1 |
| 5,847,951 | A | | 12/1998 | Brown et al. .............. 363/147 |
| 5,901,044 | A | * | 5/1999 | Marro ..................... 361/728 |
| 5,938,451 | A | | 8/1999 | Rathburn ................ 439/66 |
| 5,956,231 | A | * | 9/1999 | Yamada et al. .......... 361/728 |
| 5,975,914 | A | | 11/1999 | Uchida ................... 439/66 |
| 6,054,765 | A | | 4/2000 | Eytcheson et al. ........ 257/724 |
| 6,072,707 | A | | 6/2000 | Hochgraf ................ 363/71 |
| 6,078,173 | A | | 6/2000 | Kumar et al. ............ 324/158.1 |
| 6,078,501 | A | | 6/2000 | Catrambone et al. ...... 361/704 |
| 6,147,882 | A | * | 11/2000 | Huber et al. ............. 363/39 |
| 6,166,937 | A | | 12/2000 | Yamamura et al. ........ 363/141 |
| 6,176,707 | B1 | | 1/2001 | Neidich et al. ........... 439/66 |
| 6,212,087 | B1 | | 4/2001 | Grant et al. .............. 363/144 |
| 6,292,371 | B1 | | 9/2001 | Toner, Jr. ................ 361/752 |
| 6,359,331 | B1 | * | 3/2002 | Rinehart et al. ........... 257/691 |
| 6,434,008 | B1 | | 8/2002 | Yamada et al. ........... 361/728 |
| 6,603,672 | B1 | | 8/2003 | Deng et al. .............. 363/37 |
| 6,803,746 | B2 | * | 10/2004 | Aker et al. .............. 320/139 |
| 6,912,134 | B2 | * | 6/2005 | Grant et al. ............. 361/760 |
| 2002/0034088 | A1 | | 3/2002 | Parkhill et al. ........... 363/144 |
| 2002/0111050 | A1 | | 8/2002 | Parkhill et al. ........... 439/65 |
| 2002/0118560 | A1 | | 8/2002 | Ahmed et al. ............ 363/144 |
| 2002/0126465 | A1 | | 9/2002 | Maly et al. .............. 361/818 |
| 2002/0167828 | A1 | | 11/2002 | Parkhill et al. ........... 363/144 |

FOREIGN PATENT DOCUMENTS

| | | |
|---|---|---|
| EP | 0 427 143 A2 | 5/1991 |
| EP | 0 578 108 A1 | 1/1994 |
| JP | 9-117126 | 5/1997 |

OTHER PUBLICATIONS

Persson, E., "Power Electronic Design and Layout Techniques for Improved Performance and Reduced EMI," in *Proceedings of Power Electronics in Transportation, IEEE*, Dearborn, Michigan, Oct. 20-21, 1994, pp. 79-82.
U.S. Appl. No. 10/642,424, filed Aug. 14, 2003, Ahmed et al.
U.S. Appl. No. 60/233,992, filed Sep. 20, 2000, Parkhill et al.
U.S. Appl. No. 60/233,993, filed Sep. 20, 2000, Ahmed.
U.S. Appl. No. 60/233,994, filed Sep. 20, 2000, Maly et al.
U.S. Appl. No. 60/233,995, filed Sep. 20, 2000, Maly et al.
U.S. Appl. No. 60/233,996, filed Sep. 20, 2000, Parkhill et al.
U.S. Appl. No. 60/471,387, filed May 16, 2003, Flett et al.

* cited by examiner

POWER CONVERTER ARCHITECTURE EMPLOYING AT LEAST ONE CAPACITOR ACROSS A DC BUS

BACKGROUND OF THE INVENTION

1. Field of the Invention

This disclosure is generally related to electrical power systems, and more specifically to power converter architectures suitable for rectifying, inverting and/or converting electrical power between power sources and loads.

2. Description of the Related Art

Power converters are used to transform and/or condition power from one or more power sources to supply to one or more loads. An inverter is commonly used to transform direct current (DC) to alternating current (AC), for use in supplying power to an AC load, for example, a three phase electric motor. A rectifier is commonly used to transform AC to DC. A DC/DC converter is commonly used to step up or step down a DC voltage. An appropriately configured and operated power converter may perform any one or more of these functions.

There are a large variety of applications requiring power transformation. For example, a DC power source such as a fuel cell system, battery and/or ultracapacitor may produce DC power, which must be inverted to supply power to an AC load such as an AC motor in an electric or hybrid vehicle. A photovoltaic array may produce DC power that must be inverted to supply or export AC power to a power grid of a utility. An AC power source such as a power grid or microturbine may need to be rectified to supply power to a DC load such as a tool, machine or appliance or the DC input of an inverter. A high voltage DC source may need to be stepped down to supply a low voltage load, or a low voltage DC source may need to be stepped up to supply a high voltage load. Other applications will become apparent to those skilled in the art based on the teachings herein.

Many applications for power converters are cost and/or size sensitive. These applications will employ other alternatives if sufficiently inexpensive converters are not available in packages with a sufficiently small footprint. Thus, it is desirable to reduce the cost and footprint of power converters, without reducing the rated power.

BRIEF SUMMARY OF THE INVENTION

Because of the high cost associated with custom-designed power converters, a modular base power converter has been designed, as disclosed in U.S. Provisional Application Ser. No. 60/471,387, entitled "ELECTRIC POWER CONVERTER," filed May 16, 2003, assigned to the same assignee as the present application. The base power converter may employ a high frequency capacitor and/or bulk capacitor, to provide a relatively inexpensive and small footprint option to existing power converters.

In one aspect, a power converter comprises a housing; a first DC bus structure; a second DC bus structure electrically isolated from the first DC bus structure; a circuit electrically coupled between the first and the second DC bus structures; a high frequency capacitor comprising an anode and a cathode, the anode electrically coupled to the first DC bus structure and the cathode electrically coupled to the second DC bus structure; and a bulk capacitor comprising an anode and a cathode, the anode electrically coupled to the first DC bus structure and the cathode electrically coupled to the second DC bus structure.

In another aspect, a power converter comprises a first housing; a first DC bus bar comprising a number of terminals, at least a portion of the first DC bus bar received in the first housing with the terminals accessible from an exterior of the first housing; a second DC bus bar comprising a number of terminals, the second DC bus bar received in the first housing with the terminals accessible from the exterior of the first housing; a bridge circuit received in the first housing and electrically coupled between the first and the second DC bus bars; a high frequency capacitor comprising an anode and a cathode, the anode electrically coupled to at least one terminal of the first DC bus bar and the cathode electrically coupled to at least one terminal of the second DC bus bar; and a bulk capacitor comprising an anode and a cathode, the anode electrically coupled to at least one terminal of the first DC bus bar and the cathode electrically coupled to at least one terminal of the second DC bus bar.

In yet another aspect, a power converter comprises a first housing; a circuit board received in the first housing; a first DC bus bar comprising a first set of terminals, the first DC bus bar received at least partially in the first housing with the first set of terminals accessible from an exterior thereof; a second DC bus bar comprising a second set of terminals, the second DC bus bar received at least partially in the first housing with the second set of terminals accessible from an exterior thereof; a number of switches mounted to the circuit board and electrically coupled to one another to form a bridge circuit electrically coupled between the first and the second DC bus bars; a first film capacitor electrically coupled across the terminals of the first and the second DC bus bars; and a second film capacitor electrically coupled across the terminalsof the first and the second DC bus bars.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well known structures associated with power converters and power modules have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising", are to be construed in an open, inclusive sense, that is as "including, but not limited to."

Figure 1:
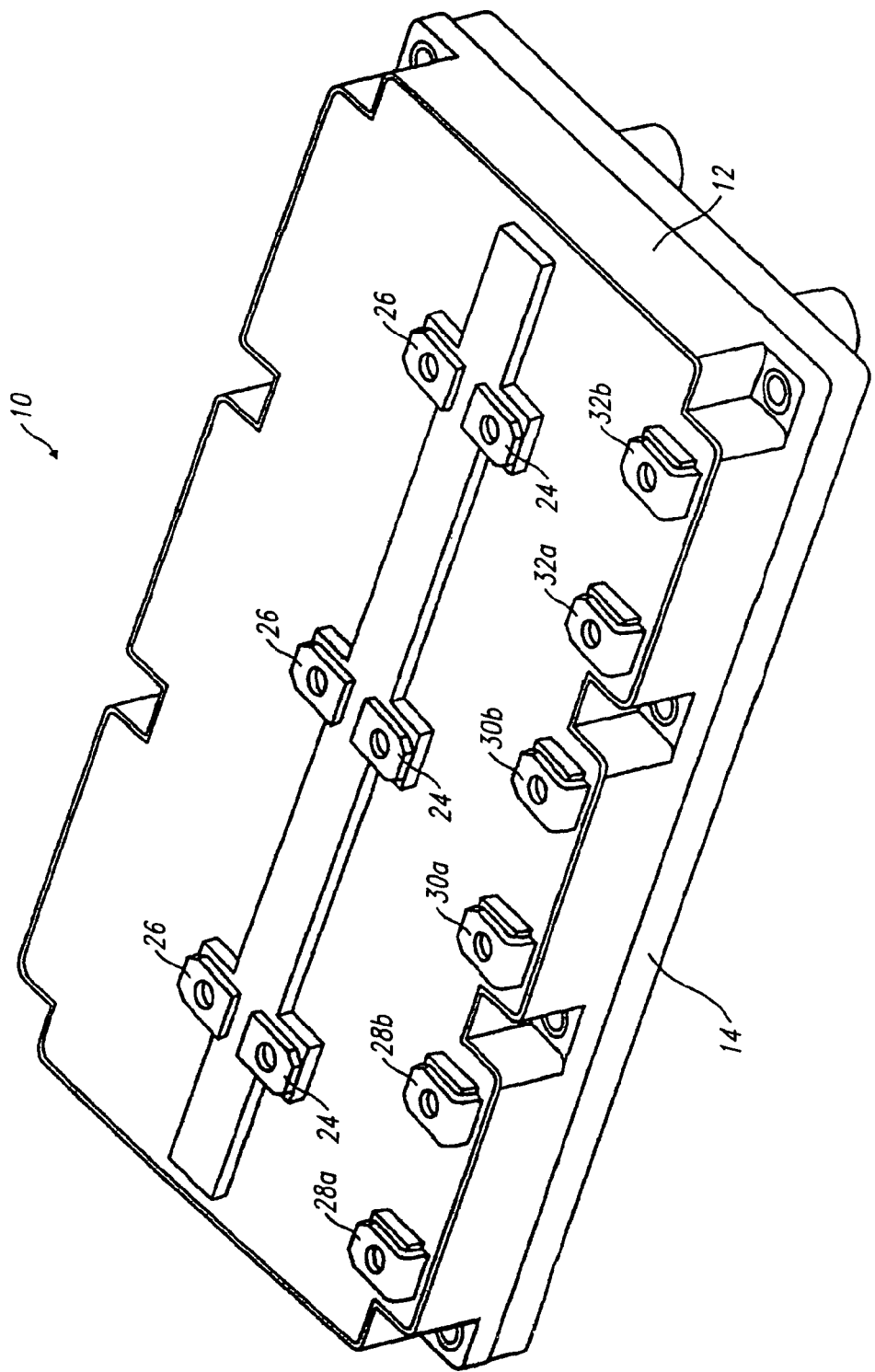
FIG. 1 is an isometric view of a base power converter comprising a first housing, integrated cold plate, a DC bus and an AC bus according to one illustrated embodiment.
Figure 2:
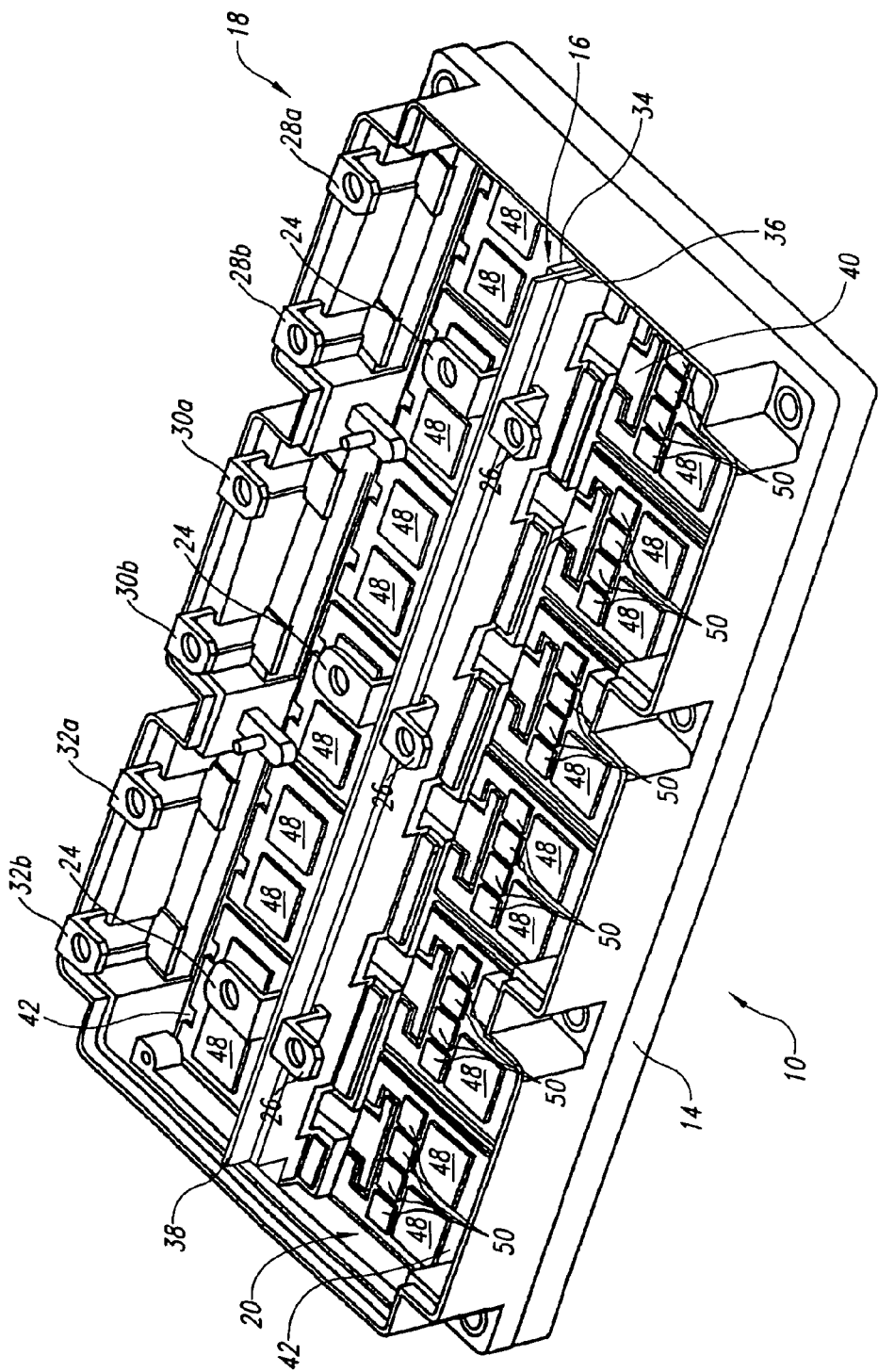
FIG. 2 shows an isometric view of the base power converter of FIG. 1 with the gate driver board removed to show the DC bus, the AC bus, and power semiconductor bridge circuitry carried by a number of regions of a substrate.

FIGS. 1 and 2 show a base power converter 10, generally comprising: a lead frame or housing 12, a cold plate 14 attached to the housing 12, a DC bus 16, an AC bus 18, power semiconductor devices 20 electrically coupled between the DC bus 16 and AC bus 18.

The DC bus 16 includes two sets of DC bus terminals 24, 26 extend out of the housing 12. As discussed in detail below, in some applications, one set of DC bus terminals 26 is electrically coupled to a positive voltage or high side of a power source or load and another set of DC bus terminals 24 is electrically coupled to a negative voltage or low side of the power source or load. In other applications, the DC bus terminals 24, 26 are electrically coupled to respective DC bus terminals 24, 26 on another power converter.

The AC bus 18 includes a set of AC phase terminals. As illustrated the AC bus 18 comprises three pairs of AC bus phase terminals 28a, 28b, 30a, 30b, 32a, 32b extending out of the housing 12. As discussed in detail below, in some applications, one pair of AC phase terminals is coupled to a respective phase (A, B, C) of a three-phase power source or load. In other applications, some of the AC phase terminals 28a, 28b, 30a, 30b, 32a, 32b are interconnected across or between the pairs, and coupled to power sources or loads.

The DC bus 16 includes two DC bus structures illustrated as DC bus bars 34, 36, each including three DC bus terminals 24, 26, spaced along the longitudinal axis thereof, to make electrical connections, for example, to a DC power source. Without being restricted to theory, applicants believe that the spacing of the terminals 24, 26 along the DC bus bars 34, 36 provide smoother current flow within the DC bus bars 34, 36.

Because the DC bus bars 34, 36 are parallel, counterflow of current is permitted, thereby canceling the magnetic fields and reducing inductance. In addition, the parallel DC bus bars 34, 36 and bus bar insulation 38 construct a distributed capacitance. As will be understood by one of ordinary skill in the art, capacitance dampens voltage overshoots that are caused by the switching process. Thus, the DC bus bars 34, 36 create a magnetic field cancellation as a result of the counterflow of current, and capacitance dampening as a result of also establishing a functional capacitance between them and the bus bar insulation 38.

In contrast to typical power converters, the DC bus bars 34, 36 are internal to the housing 12. This approach results in better utilization of the bus voltage, reducing inductance, and consequently permitting higher bus voltages while maintaining the same margin between the bus voltage and the voltage rating of the various devices. The lower inductance reduces voltage overshoot, and problems associated with voltage overshoot such as device reliability. The increase in bus voltage permits lower currents for a given power, hence the use of less costly devices. The bus bar insulation 38 between the DC bus bars 34, 36 may be integrally molded as part of the housing 12, to reduce cost and increase structural rigidity. The DC bus bars 34, 36 may be integrally molded in the housing 12, or alternatively, the DC bus bars 34, 36 and bus bar insulation 38 may be integrally formed as a single unit and attached to the housing 12 after molding, for example, via post assembly.

FIG. 2 illustrates the topology of a substrate 40 and associated regions 42 and the power semiconductor devices 20 in further detail. The power semiconductor devices 20 are operable to transform and/or condition electrical power. The power semiconductor devices 20 may include switches, for example, transistors such as integrated bipolar gate transistors (IGBTs) or metal oxide semiconductor field effect transistors (MOSFETs) 48, and/or diodes 50. The power converter 10 and power semiconductor devices 20 may be configured and operated as an inverter (DC→AC), rectifier (AC→DC), and/or converter (DC→DC; AC→AC). For example, the power converter 10 and/or power semiconductor devices 20 may be configured as full bridges, half bridges, and/or H-bridges, as suits the particular application.

The regions 42 carrying the power semiconductor devices 20 are formed on the substrate 40, for example by etching. Alternatively, each region 42 may take the form of a discrete substrate. Substrate 40 is integrally formed with the cold plate 14, which thus also serves as a base plate. For example, the power semiconductor devices 20 may be carried by a dual bonded copper (DBC) comprising a conductive layer which is directly attached to the cold plate 14 via soldering. The use of a cold plate 14 as the base plate, and the direct mounting of the substrate 40 thereto, enhances the cooling for the power semiconductor devices 20 mounted on the regions 42 of the substrate 40 over other designs.

Each region 42 typically carries two IGBTs 48 and four diodes 50. However, the inclusion of specific component types (switches such as IGBTs and/or diodes) and the number of each component on a region 42 may depend on the specific application. For example, a region 42 may carry up to four IGBTs 48, or alternatively, up to eight diodes 50. Alternatively, a region 42 may carry four diodes 50 and omit IGBTs 48, for example, where the power semiconductor devices 20 on the region 42 will act a rectifier. The ability to eliminate components where the specific application does not require these components produces significant cost savings. The ability to add additional components of one type in the place of components of another type on a region 42 provides some flexibility in adjusting the current and/or voltage rating of the power converter 10. Thus, this modular approach reduces costs, and provides flexibility in customizing to meet demands of a large variety of customers. Of course, other sizes of regions 42, which may carry more or less components, are possible.

Figure 3:
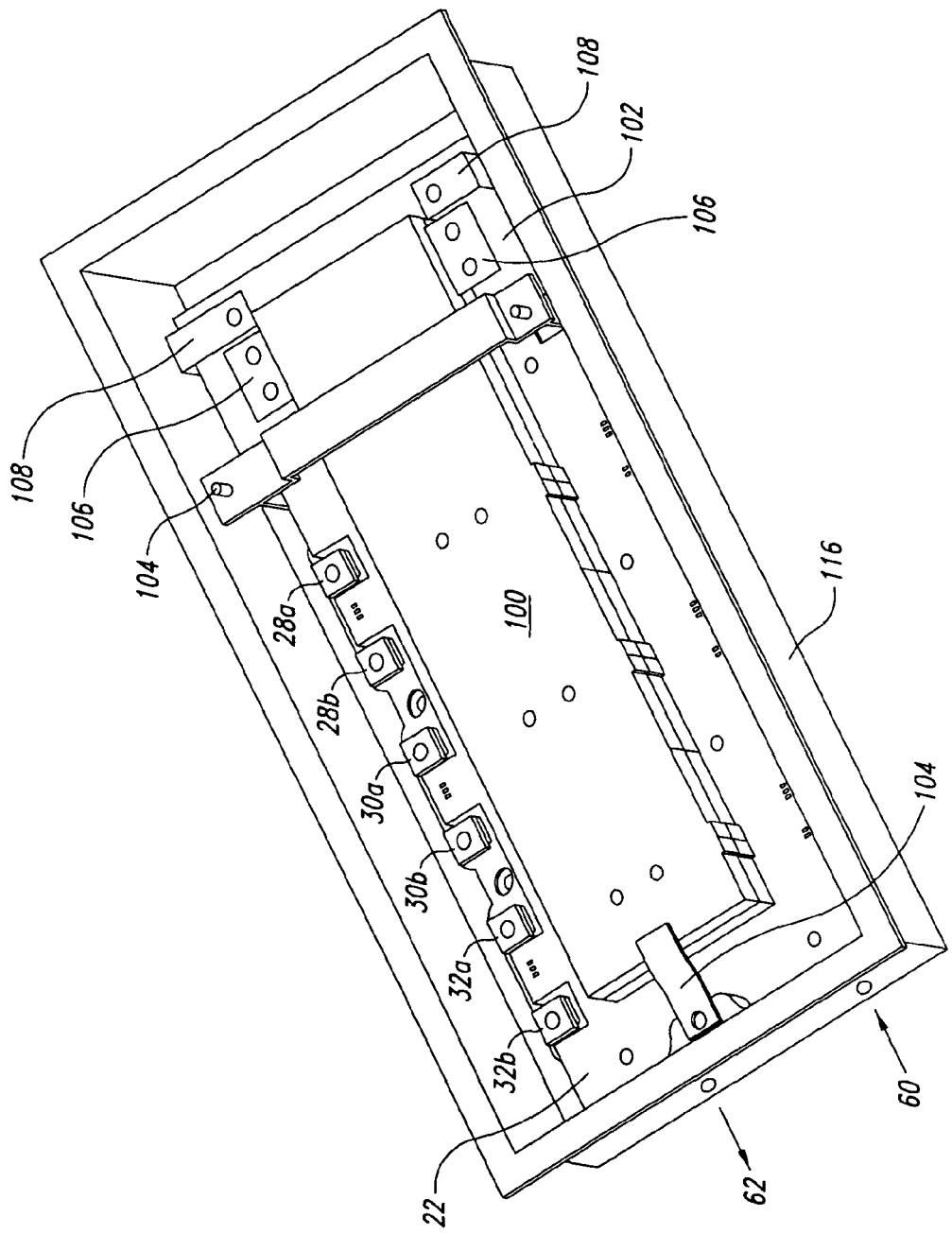
FIG. 3 shows an isometric view of a power converter according to one embodiment, comprising a high frequency capacitor and bulk capacitor coupled across the DC bus of the base power converter, a second housing to receive the capacitors and first housing, and a gate driver.
Figure 4:
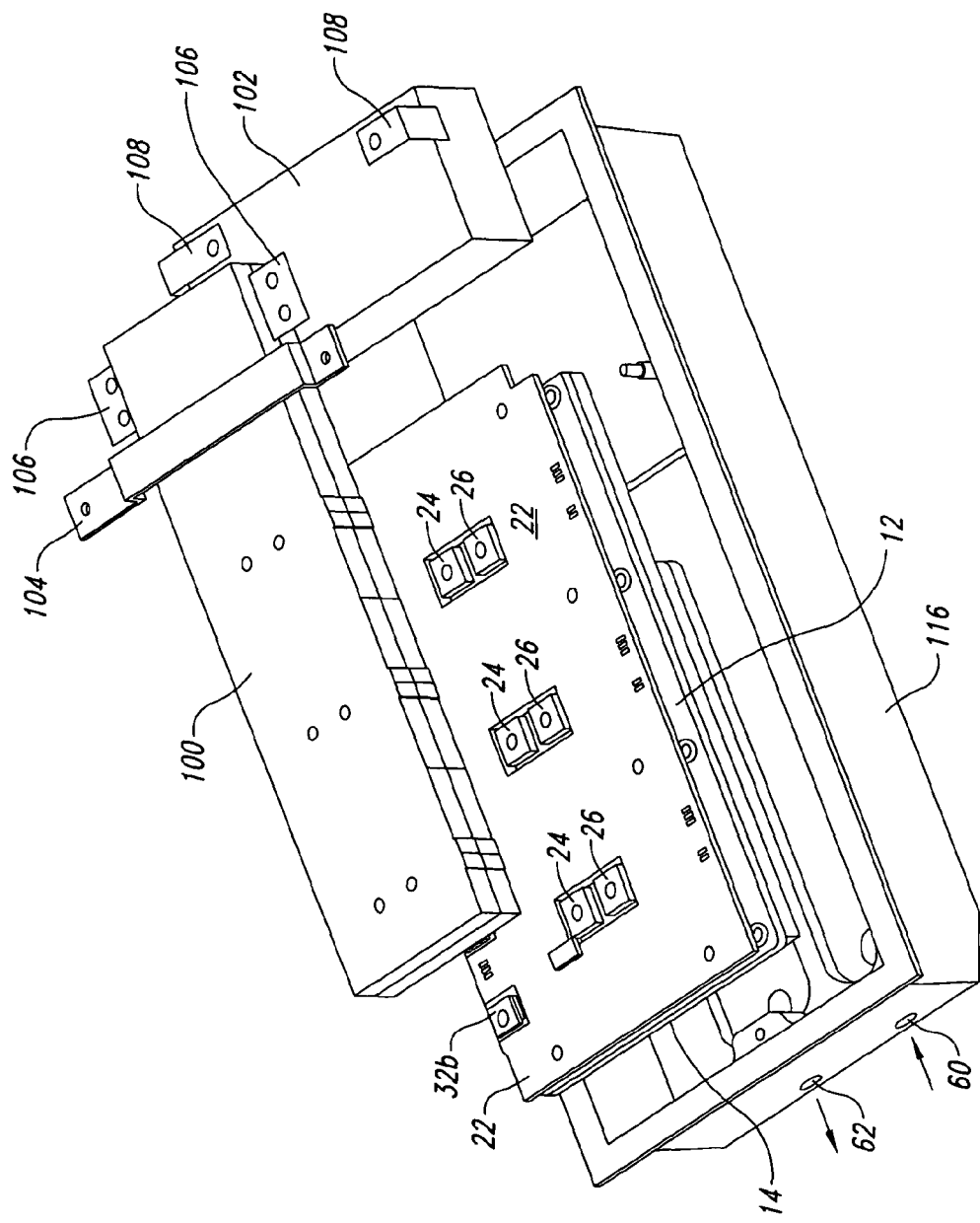
FIG. 4 is an exploded isometric view of the power converter of FIG. 3.

FIGS. 3 and 4 show an embodiment of the base power converter 10 configured with a high frequency capacitor 100 and a bulk capacitor 102, suitable for a variety of high power applications, for example, as a 600V, 800 A inverter. FIGS. 3 and 4 also illustrate a gate driver board 22 (not shown in FIGS. 1 and 2 so as to illustrate the structure under the gate driver board 22). As illustrated in FIGS. 3 and 4, a second housing 116 receives the first housing 12, as well as both the high frequency capacitor 100 and the bulk capacitor 102. The second housing 116 may provide an enclosure or channels to provide liquid cooling in the cold plate 14.

The high frequency capacitor 100 may be a film capacitor, rather than an electrolytic capacitor. This provides a tightly coupled, low impedance path for high frequency components of current. The high frequency capacitor 100 may be physically coupled adjacent the gate driver board 22 via various clips, clamps, and/or fasteners 104, 106. The high frequency capacitor 100 may overlay a portion of the first housing 12, and may be electrically coupled to the DC bus bars 34, 36 (FIG. 2) via the terminals 24, 26, respectively.

The bulk capacitor 102 may be an electrolytic capacitor or a film capacitor such as a polymer film capacitor, and may be physically coupled adjacent the gate driver board 22 via various clips, clamps, and/or fasteners 108. The bulk capacitor 102 may be electrically coupled to the DC bus bars 34, 36 via the terminals 24, 26, respectively. Alternatively, the anode of the bulk capacitor 102 may be electrically coupled to the anode of the high frequency capacitor 100 and the cathode of the bulk capacitor 102 may be electrically coupled to the cathode of the high frequency capacitor 100 via DC interconnects.

The second housing 116 is provided to physically receive the high frequency capacitor 100, the bulk capacitor 102, the base power converter 10 and first housing 12. The second housing 116 further accepts the cold plate 14, containing an inlet aperture 60 and outlet aperture 62 for liquid cooling of the cold plate 14. The cold plate 14 may take the form of a pin finned aluminum silicone carbide (ALSIC) plate. The use of ALSIC plate closely matches the thermal expansion properties of the substrate 40, thus reducing cracking and the void formation associated with thermal cycling. This particular embodiment employs liquid cooling of the cold plate 14 via inlet 60 and outlet 62.

Tightly coupling the bulk capacitor 102 and high frequency capacitor 100 to the DC bus bars 34, 36, avoids bus bar problems typically associated with DC bus bars 34, 36, and may allow the elimination of overvoltage (i.e., snubber) capacitors. The high frequency capacitor 100 provides a very low impedance path for the high-frequency components of the switched current. The prior art of high-frequency paths (sometimes called "decoupling" or "snubber" paths) placed a discrete package external to the module. Since this path included a significant stray inductance, the discrete package was large. For example, in one embodiment, the discrete capacitor is 1 uF. However, the inclusion of the high frequency capacitor 100 serves the purpose better, but with only 50 nF (5% of the capacitance). Further, this makes the capacitor so small it did not impact the size of the power module 10, thus completely eliminating the need external hardware and volume requirements.

Although specific embodiments of and examples for the power converter and method of the invention are described herein for illustrative purposes, various equivalent modifications can be made without departing from the spirit and scope of the invention, as will be recognized by those skilled in the relevant art. The teachings provided herein can be applied to power modules and power converters, rectifiers and/or inverters not necessarily the exemplary power converters and systems generally described above.

While elements may be described herein and in the claims as positive or negative, such denomination is relative and not absolute. Thus, an element described as positive is shaped, positioned, and/or electrically coupled to be at a higher relative potential than elements described as negative when the power converter is coupled to a power source. Positive elements are typically intended to be coupled to a positive terminal of a power source, while negative elements are intended to be coupled to a negative terminal or ground of the power source. Generally, positive elements are located or coupled to the high side of the power converter and negative elements are located or coupled to the low side of the power converter.

The power converters described above may employ various methods and regimes for operating the power converter and for operating the switches. The particular method or regime may be based on the particular application and/or configuration. Basic methods and regimes will be apparent to one skilled in the art, and do not form the basis of the inventions described herein so will not be discussed in detail for the sake of brevity and clarity.

All of the above U.S. patents, U.S. patent application publications, U.S. patent applications, foreign patents, foreign patent applications and non-patent publications referred to in this specification and/or listed in the Application Data Sheet, including but not limited to commonly assigned U.S. Application Ser. Nos. 60/233,992; 60/233,993; 60/233,994; 60/233,995 and 60/233,996, each filed Sep. 20, 2000; Ser. No. 09/710,145, filed Nov. 10, 2000; Ser. Nos. 09/882,708 and 09/957,047, both filed Jun. 15, 2001; Ser. Nos. 09/957,568 and 09/957,001, both filed Sep. 20, 2001; Ser. No. 10/109,555, filed Mar. 27, 2002; Ser. No. 60/471,387, filed May 16, 2003; Ser. Nos. 10/642,391 and 10/642,424, both filed Aug. 14, 2003; and Ser. No. 10/658,804, filed Sep. 9, 2003, are each incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A power converter, comprising: a first housing; a substrate received in the first housing, the substrate comprising a number of regions; a first DC bus bar comprising a first set of terminals, the first DC bus bar received at least partially in the first housing with the first set of terminals accessible from an exterior thereof; a second DC bus bar comprising a second set of terminals, the second DC bus bar received at least partially in the first housing with the second set of terminals accessible from an exterior thereof; a number of switches mounted to at least some of the regions of the substrate and electrically coupled to one another to form a bridge circuit electrically coupled between the first and the second DC bus bars; a first film capacitor disposed in the exterior of the first housing and electrically coupled across the terminals of the first and the second DC bus bars; and a second film capacitor disposed in the exterior of the first housing and electrically coupled across the terminals of the first and the second DC bus bars; and a first DC interconnect electrically coupling an anode of the first film capacitor to an anode of the second capacitor; and a second DC interconnect electrically coupling a cathode of the first capacitor to a cathode of the second film capacitor.

2. The power converter of claim 1 further comprising: a second housing receiving the first housing, the first film capacitor and the second film capacitor.

* * * * *